United States Patent
Humphrey et al.

(10) Patent No.: US 12,416,952 B2
(45) Date of Patent: Sep. 16, 2025

(54) PROGRAMMING POWER CONTROLLERS VIA LOGIC DEVICE

(71) Applicant: HEWLETT PACKARD ENTERPRISE DEVELOPMENT LP, Spring, TX (US)

(72) Inventors: Daniel Alan Humphrey, Cypress, TX (US); Stewart Gavin Goodson, II, Cypress, TX (US); Mohamed Amin Bemat, Cypress, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 166 days.

(21) Appl. No.: 18/361,191

(22) Filed: Jul. 28, 2023

(65) Prior Publication Data

US 2025/0036178 A1    Jan. 30, 2025

(51) Int. Cl.
| | |
|---|---|
| *G06F 1/26* | (2006.01) |
| *G06F 9/24* | (2006.01) |
| *G06F 9/4401* | (2018.01) |
| *G06F 9/445* | (2018.01) |

(52) U.S. Cl.
CPC .................. *G06F 1/26* (2013.01); *G06F 9/24* (2013.01); *G06F 9/4401* (2013.01); *G06F 9/445* (2013.01)

(58) Field of Classification Search
CPC ... G06F 1/26; G06F 9/445; G06F 9/24; G06F 9/4401
USPC .................................. 713/1, 2, 100, 300, 330
See application file for complete search history.

(56) References Cited

U.S. PATENT DOCUMENTS

| | | | | |
|---|---|---|---|---|
| 5,867,507 | A * | 2/1999 | Beebe | G01R 31/318558 714/726 |
| 6,351,139 | B1 * | 2/2002 | Ighani | G11C 7/1036 326/46 |
| 6,901,572 | B1 * | 5/2005 | Dougherty | G06F 30/34 713/300 |
| 7,375,549 | B1 * | 5/2008 | Tang | H03K 19/17772 326/38 |
| 9,941,880 | B1 * | 4/2018 | Lesea | H03K 19/003 |
| 10,560,015 | B1 * | 2/2020 | Livescu | H02M 7/217 |
| 2008/0186052 | A1 * | 8/2008 | Needham | H03K 19/17758 326/38 |
| 2017/0367210 | A1 * | 12/2017 | Chen | H05K 7/1447 |
| 2022/0187888 | A1 * | 6/2022 | Henspeter | G06F 1/26 |
| 2023/0069232 | A1 * | 3/2023 | Hosoi | H04L 12/40169 |

\* cited by examiner

*Primary Examiner* — Ji H Bae
(74) *Attorney, Agent, or Firm* — Jones Robb PLLC

(57) ABSTRACT

A computing device comprises a primary printed circuit board (PCB), one or more computing components mounted to the primary PCB, a baseboard management controller (BMC) mounted to the primary PCB, a power subsystem, and a logic device coupled to the primary PCB. The power subsystem comprises a power controller with a first logic pin, and the logic device is communicably connected to the first logic pin. The logic device is configured to program the power controller by placing the power controller in a programming mode and inputting programming information into the power controller via the first logic pin.

13 Claims, 5 Drawing Sheets

PROGRAMMING POWER CONTROLLERS VIA LOGIC DEVICE

INTRODUCTION

Computing devices (such as servers) generally include power subsystems that are configured to convert input electrical power (such as mains AC power or a high-voltage DC input power) into one or more different forms that are suitable for the components of the electronic device. Such electrical subsystems typically include a power supply unit (PSU) and one or more voltage regulators (VRs), among other power delivery components. The PSU is generally configured to perform an initial stage of power conversion to provide bulk power for the entire electronic device and is often provided as a removable unit which is distinct from a primary printed circuit board (PCB) (e.g., motherboard) of the computing system. The VRs, in contrast, are generally configured to provide regulated power to just one specific component (such as a CPU) and are usually provided physically adjacent to the component they power (such as mounted on the primary PCB). For example, in some computer systems the PSU may convert a higher voltage AC or DC input power into one or more lower-voltage DC power signals (e.g., 12V DC, 5V DC, and 3.3V DC), and then a group of VRs provided on the primary PCB adjacent to the CPU may convert one of these power signals from the PSU into a regulated low-voltage high-current power signal (e.g., 1.2V) that is suitable for powering the CPU.

The power subsystems generally comprise a number of power controllers (e.g., microcontrollers, state machines, etc.) that control the operations of the powered components. For example, the PSU often includes at least a primary microcontroller that is part of, and controls the functions of, a primary side of the PSU and a secondary microcontroller that is part of, and controls the functions of, a secondary side of the PSU. In addition, VRs also generally comprise a controller which controls the functions thereof.

BRIEF DESCRIPTION OF THE DRAWINGS

The present disclosure can be understood from the following detailed description, either alone or together with the accompanying drawings. The drawings are included to provide a further understanding of the present disclosure and are incorporated in and constitute a part of this specification. The drawings illustrate one or more examples of the present teachings and together with the description explain certain principles and operation. In the drawings.

DETAILED DESCRIPTION

Figure 1:
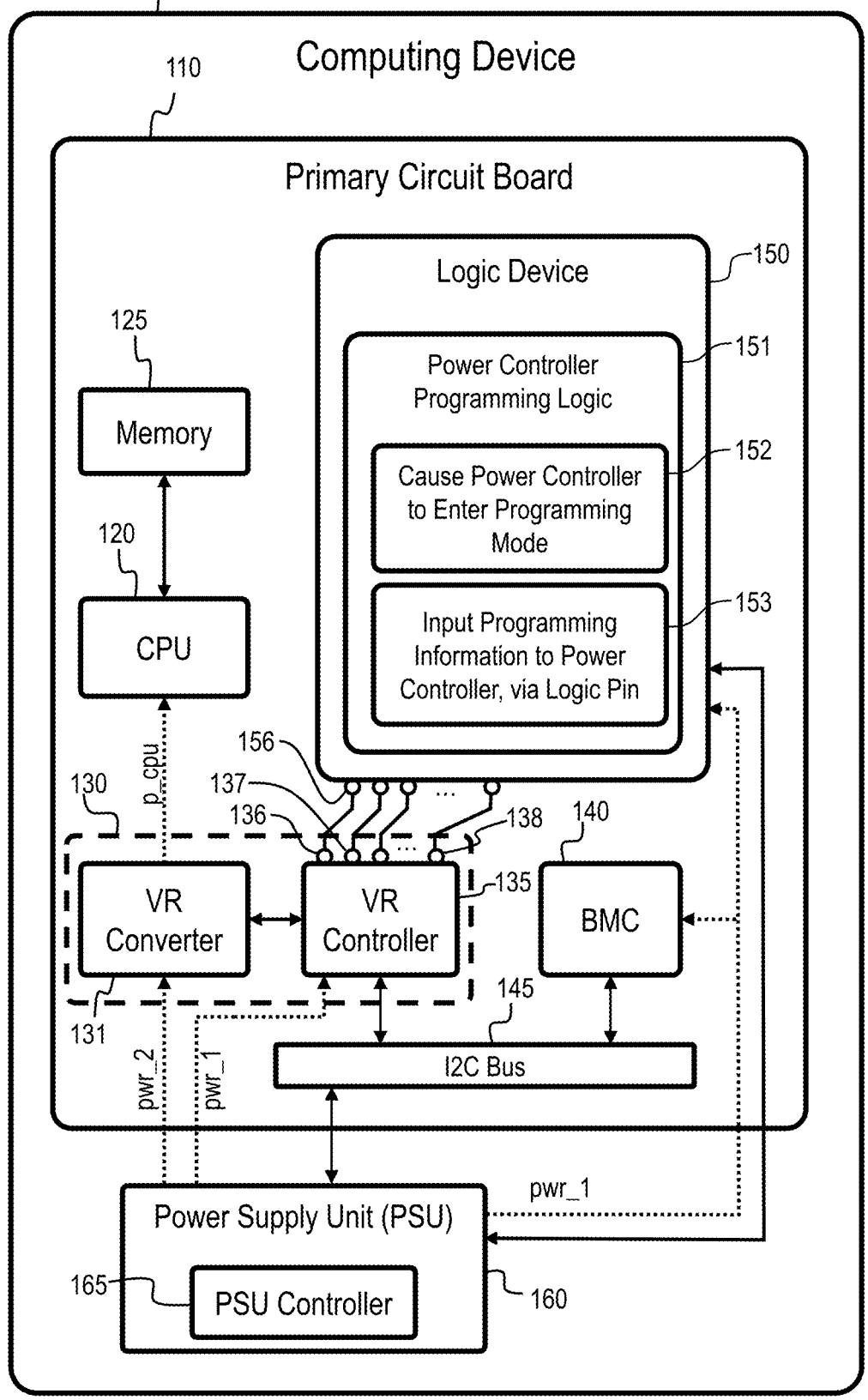
FIG. 1 is a block diagram illustrating an example computing device.

As noted above, power subsystems of computing devices generally comprise a number of microcontrollers that control various functions, such as microcontrollers of the PSU and VR controllers. These power controllers tend to be commodity parts that are sourced by computing device manufactures from various vendors. Generally, the power controllers may be initially programmed by the vendors. If it is later desired to reprogram or configure the power controllers, then such programming has typically been performed by a baseboard management controller (BMC) of the primary PCB of the computing device via an I2C communication bus (or similar communications bus). However, there are a number of issues associated with this approach to programming the power controllers. Accordingly, to mitigate or resolve these issues, new and improved approaches to programming the power controllers are disclosed herein which, among other things, utilize a logic device and direct logic pin connections, rather than the BMC and I2C bus, to program the power controllers. The issues with using the BMC and I2C bus to program the power controllers, and aspects of the new and improved approaches disclosed herein, will be described in turn below.

A first issue associated with using the BMC and I2C bus to program the power controllers is that it is expected that, in the future, the manufacturer of a computing device may have less control (may be even no control) over the configuration of the BMC that is used in the computing device (at least in some cases). Consequently, if BMCs continue to be used to program the power controllers, then the manufacturer of the computing device may be expected to have less control (may be no control) over how the power controllers are programmed. But a manufacturer of the computing device may desire, in some cases, to retain control over how the power controllers are programmed, for example because this can allow the manufacturer to optimize power usage for different system configurations, improve security, or otherwise improve the power controllers. Thus, there is a need for an approach to programming the power controllers that allows the manufacturer of the computing device to retain control over the programming even if they cannot control the configuration of the BMC.

The reduction in control by the computing device manufacturer over the BMC (and consequent reduction in control over the programming of power controllers) may occur, for example, due to expected industry movement towards using modularized BMCs. Traditionally, a BMC is tightly integrated into the primary PCB of the computing device, and may be proprietary to the manufacturer of the computing device, and therefore the BMC is generally a known quantity and either directly or indirectly under the control of the manufacturer of the computing device. In contrast, modularized BMCs may be less tightly integrated into the primary PCB (e.g., they may be removable), more standardized, and potentially interchangeable. Consequently, if a modularized BMC system design is used, BMCs from multiple different sources may be usable with the device and therefore the manufacturer of the computing device cannot be assured that their intended BMC will ultimately be the one that is used. For example, even if the manufacturer uses a propriety BMC originally in the device, the modular nature of the BMCs may allow for the original BMC to be later swapped out for a different BMC from a different source. Accordingly, the manufacturer of the computing device may no longer be able to predict or control which BMC will be used in their computing devices, and thus they may lack control over how the BMC will program/configure the power controllers.

A second issue with relying on the BMC and I2C bus to configure the power controllers is that this can make it more difficult and costly to use power controllers sourced from multiple vendors, and this may be the case whether a traditional or modular BMC design is used. Generally, to ensure adequate supply of commodity parts (such as power controllers), a manufacturer of a computing device may desire to utilize multiple different vendors for those parts. But, as discussed in greater detail below, if the power controllers from different vendors are to be used and if the BMC is to configure these power controllers, then in some cases differently configured circuit boards may be needed for each different vendors' power controllers, even if the overall computing devices in which they are included are otherwise the same. This means that the manufacturer of the computing device may need to design and produce multiple differently configured circuit boards for each model of computing device, which can be costly. Moreover, having multiple different circuit board designs for each model of computing device can proliferate SKUs, complicate logistics, and generally increase the costs and difficulty of manufacture. Thus, there is a need for an approach to programming the power controllers that allows for different vendors' power controllers to be utilized without requiring differently configured circuit boards for receiving those power controllers.

Some of the reasons for why differently configured circuit boards may be needed when different vendors' power controllers are used and the BMC is used for programming the controllers are as follows. Generally, the BMC communicates with the power controllers via an I2C communications bus (or other similar bus), and such bus-based communications generally requires each of the devices communicating via the bus to have (and recognize) an assigned bus address. However, as noted above, power controllers tend to be commodity parts, and to ensure compatibility of these power controllers with multiple different systems (which may potentially assign different I2C addresses to their power controllers) the manufacturers of the power controllers do not generally program them with a single predetermined I2C bus address. Instead, the power controllers are configured to learn their assigned I2C bus address from the system in which they are installed. However, because the BMC relies on the I2C bus to communicate with the power controllers, and because I2C communications with the power controllers depend on the controllers knowing their assigned I2C address, the BMC cannot inform the controllers of their I2C addresses. Instead, the circuit board is generally hardwired to indicate a particular bus address to a given power controller by providing a predetermined electrical signal having a predetermined property (e.g., a predetermined voltage) to the power controller, and the power controller is configured to infer its I2C address from this signal (e.g., one voltage indicates a first address, a second voltage indicates a second address, and so on). For example, a primary PCB of the computing device may be provided with one or more resistors for each VR controller, and the resistances of these resistors may be carefully selected such that when electric signals are flowed through the resistors to the VR controllers, each VR controller receives a specific voltage that indicate its respective I2C address. In this manner, the proper I2C addresses for the VR controllers are hard encoded into the system board by the appropriate selection of the resistors. However, each power controller vendor may configure their power controllers to interpret the electrical signals received from the circuit board in a different manner—for example, a first voltage may be understood by a first vendor's power controller as indicating one address but may instead be understood by a second vendors' power controller as indicating a different address. Accordingly, different electrical signals (e.g., different voltages) may need to be provided by the circuit boards to indicate the addresses, depending on which vendors' power controller is utilized, and because these electrical signals are hardwired into the circuit board, different circuit board configurations may be needed for different vendors' power controllers (e.g., different combinations of resistors may be needed for each vendor).

A third issue with using the BMC and I2C bus to program power controller is that changes in configuration made in this manner tend to be slow. Generally, when a change in programming is made by the BMC and I2C bus, and the power controllers need to interrupt their ongoing processes to communicate over the I2C bus, interpret and analyze the communications from the I2C bus, and then take action based on programing, which can take non-negligible amount of time. Moreover, in many situations a programmed change in configuration requires the power controller to be power cycled after a configuration change in order for the change to take effect. The latency of making configuration changes, and the potential need for power cycling for some changes to take effect, can make it impractical to use the BMC and I2C bus to make configuration changes dynamically in real time, such as changes to adjust an operating set point of a device in response to changed conditions.

The present disclosure provides technical solutions to the aforementioned problems, which include using a logic device of the primary PCB (e.g., a complex programable logic device (CPLD)) to program the power controllers via a direct connection to one or more logic pins of the power controllers, instead of (or in addition to) using the BMC and the I2C bus to program the power controllers. The logic device (e.g., CPLD) may be provided to manage the logic signals that control the operations of the power controllers during usage, such as a power sequencing function during startup of the device. By using the logic device to also program the power controllers, manufacturers of the computing systems may retain some control over how the power controllers are configured even if they do not have control over the BMC that is used in the computing system. Moreover, because the logic device does not use the I2C bus to communicate with the power controllers (unlike the BMC), the logic device can configure the power controllers from different vendors even if the power controllers initially have unknown or incorrect I2C addresses.

In some examples, the programming performed by the logic device may include configuring the I2C addresses of the power controllers during an initial startup. Once the I2C address has been programmed by the logic device, the BMC may thereafter be able to communicate with the power controllers in the usual fashion via the I2C bus. Thus, in some examples, the addresses of the power controller may no longer need to be hardwired into the circuit boards, as the logic device can instead directly instruct the controls which address to use. Or, alternatively, the addresses may still be hardwired into the circuit board and the logic device may instruct the power controllers how to properly interpret the hardwired electrical signals, so that all vendors' controllers will interpret the electrical signals in the same way (even if their initial programing from the vendor would have caused them to interpret the signals differently). In either case, the use of the logic device to program the power controllers may enable the same circuit board configuration to be compatible with multiple different vendors' power controllers, and the need to provide differently configured system boards for different vendors' controllers can be avoided.

In addition, in some examples, the programming of the power controller by the logic device comprises a direct signal connection between the logic device and the microcontroller, with device register access, and such a connection can be extremely fast when compared to the relatively slow process of communicating via the BMC and I2C bus. Moreover, generally changes made via such direct communication with device register access to not require a power cycle before the changes can be made applicable. Thus, the examples disclosed herein may be better suited for making dynamic changes to the configuration of power controllers. This may facilitate the optimization of overall energy performance by reprogramming the power controllers to better address current conditions. For example, the power controllers may be reconfigured to operate with optimized parameters specific to the installed processor. For example, a low power processor may disable phases of the VRs, lower switching frequencies of the VRs, and optimize phase thresholds to maximize efficiency for that specific processor SKU.

Examples of computing devices and associated methods which implement these approaches will be described below in greater detail with reference to FIGS. 1-7.

FIG. 1 illustrates an example computing device 100. The computing device 100 comprises a primary printed circuit board (PCB) 110 (also sometimes called a motherboard) and a power supply unit (PSU) 160. The computing device 100 may also comprise additional components, such as data storage media, expansion cards, cooling devices, or other components which are familiar to those of ordinary skill in the art and not illustrated herein.

The primary PCB 110 comprises one or more CPUs 120, one or more memory devices 125, and one or more voltage regulators (VR) 130 for supplying power to the CPU 120. FIG. 1 illustrates just one of each of the forgoing components to simplify the illustration, but it should be understood that in various examples there may be any number of each of these components mounted on the primary PCB 110. In addition, the primary PCB 110 comprises a BMC 140, an I2C bus 145, and a logic device 150. As will be described in greater detail below, the logic device 150 is configured to program one or more power controllers of the computing device 110 according to example techniques described herein. These components will each be described in greater detail in turn below.

The CPU 120 comprises one or more processors and associated supporting components, as would be familiar to those of ordinary skill in the art. The memory 125 may comprise volatile or non-volatile memory device, such as Random Access Memory (RAM), which stores instructions executable by the CPU 120. In some examples, the CPU 120 and memory 125 may be separate modules which are removably mounted to the primary PCB 110, whereas in other examples the CPU 120 and memory 125 may be part of the same integrated circuit (e.g., a socket-on-chip or SoC) which is either removably mounted to, or integrated into, the circuit board 110.

The voltage regulators 130 are configured to supply regulated electrical power to the CPU 120 (or to the SoC which comprises the CPU 120, in examples which comprise such an SoC). More specifically, the voltage regulators 130 may comprise a VR converter 131 and a VR controller 135. The VR converter 131 receives a DC power signal (e.g., pwr_2) from the PSU 160 and, under the control of the VR controller 135, converts this into an output DC power signal appropriate for the CPU 120 (e.g., p_cpu). For example, pwr_2 may be a 12V, 5V, or 3.3V bulk DC power signal, whereas p_cpu may have a comparatively lower-voltage (e.g., 1.2V) but relatively tighter regulation (lower fluctuation in voltage), and a relatively high current. In some examples, multiple VRs 130 are provided for each CPU 120, and these may be arranged in phases to further improve the supply of power to the CPU 120, as would be familiar to those of ordinary skill in the art.

Figure 3:
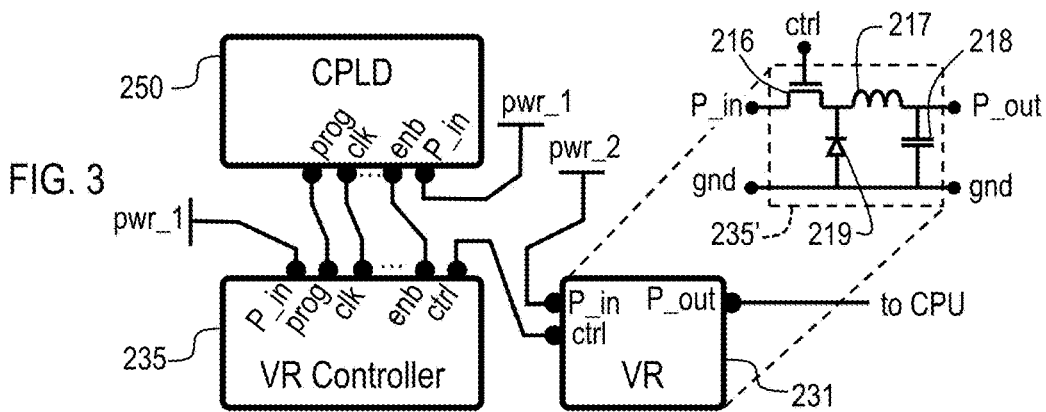
FIG. 3 is a block diagram illustrating a portion of an example computing device in a first state.

In some examples, the VR converter 131 comprises an actively controlled DC-to-DC converter having a switching regulator (or switched mode power supply) topology. In such examples, the VR converter 131 comprises (among other things) one or more switches which are switched on and off at a particular frequency and duty cycle, with the duty cycle determining how much electrical current flows through the VR converter 131. By appropriately controlling the duty cycle, the voltage output by the VR converter 131 can be controlled. Examples of switching regulator topologies that may be used in the VR converter 131 include, but are not limited to: a buck converter, boost converter, buck-boost converter, or any other switching regulator topology. An example of a buck converter topology is shown in FIG. 3, and will be described below.

The signal that controls VR converter 131 may be generated by the VR controller 135. The VR controller 135 may comprise a microcontroller which is configured to determine the appropriate parameters for the control signal (e.g., the appropriate duty cycle for the switch) and to generate and output the control signal to the VR converter 131. The VR controller 135 may also adjust the control signal dynamically in the face of changing conditions (e.g., a varying load presented by the CPU 120) to ensure that p_cpu is maintained near to a target voltage. For example, the VR controller 135 may sense the voltage of p_cpu and compare it to the target voltage, and if p_cpu differs from the target voltage then the VR controller 135 may adjust the control signal (e.g., change the duty cycle) to bring p_cpu closer to the target voltage. In some examples, the VR controller 135 is one example of a power controller which the logic device 150 may program according to the techniques disclosed herein.

In some examples, the VR converter 131 and VR controller 135 are provided as separate components which together form the voltage regulator 130. For example, the VR controller 135 may be provided as one integrated circuit while the VR converter 131 is provided as a separate integrated circuit or as a collection of discrete components (e.g., a transistor, an inductor, a capacitor, a diode, etc.). In other examples, the VR converter 131 and the VR controller 136 may be provided as part of the same integrated circuit.

For ease of understanding, a VR 130 that supplies power to the CPU 120 is illustrated, but it should be understood that the computing device 100 may also include other VRs (not illustrated) for supplying power to other components of the computing device 100, such as VRs for supplying power to a graphic processing unit (GPU), VRs for supplying power to memory (e.g., memory 125), VRs for supplying power to hardware accelerators, etc. These other VRs may be similar to the VRs 130 and may include a VR controller similar to VR controller 135. In examples which include such other VRs, the VR controllers thereof may be additional examples of power controllers which may be programed by the logic device 150 according to the techniques disclosed herein.

The BMC 140 may comprise a specialized microcontroller integrated into primary PCB 110, which provides and manages an interface between system-management software and the hardware of the computing device 110. The BMC 140 may also sense operating conditions of the components of the computing device 110, provide alerts to system administrators, manage certain aspects of system security, and provide out-of-band management options for an administrator. BMCs are familiar to those of ordinary skill in the art, and thus the BMC 140 is not described in greater detail herein.

The BMC 140 may communicate with other components of the computing device 100—particularly the VR controller 126 and/or PSU controller 165—via an I2C communications bus 145. Although the initialism "I2C" technically refers to the Inter-Integrated Circuit communications bus/protocol, this term is used more broadly herein to also include any of the related communications buses/protocols that are based on, compatible with, or modified versions of Inter-Integrated Circuit, such as: System Management Bus (SMBus), Power Management Bus (PMBus), Intelligent Platform Management Bus (IPMB), Two-Wire Interface (TWI), Two-Wire Serial Interface (TWSI), and Improved Inter Integrated Circuit (I3C).

The PSU 160 comprises power conversion circuitry to convert input electrical power to one or more output power signals which are used to power other components of the computing device 100. For example, the PSU 160 may convert AC power or high-voltage DC power into lower voltage DC signals, which may be supplied to the primary PCB 110. One or more of these power signals may also be supplied other components (not illustrated), such as data storage media. The power signals provided by the PSU 160 may also be referred to as power "rails." In FIG. 1, the power signals provided by the PSU 160 include pwr_1 and pwr_2 as one example, but in other examples any number of power signals can be produced by the PSU 160, including one, two, three, or more. In some examples, the PSU 160 produces a 12V power signal, a 5V power signal, and/or a 3.3V power signal. The PSU 160 comprises one or more PSU controllers 165, which comprise microcontrollers that control the operations of the PSU 160. In some examples, these PSU controllers 165 constitute examples of the power controllers described herein which logic device 150 may program, according to example approaches described herein.

The logic device 150 is a device that comprises one or more logic circuits coupled to the primary PCB 110 and configured to, among other things, send logic signals to the power controllers to controller the overall operations of the power delivery subsystem. In particular, the logic device 150 may control a power-on sequence of the computing device 100. In some examples, the logic device 150 comprises a complex programable logic device (CPLD). In other examples, the logic device 150 may comprise some other form of logic device, such as a collection of discrete logic gates formed into a logic circuit, a programable logic device (PLD), a field programmable gate array (FPGA), etc. In some examples, the logic device 150 is integrated into the primary PCB 110, meaning the logic device 150 is formed in and/or soldered to the primary PCB 110 such that the logical device generally not removable from the primary PCB 110 without potentially destructive operations such as cutting or desoldering. This is in contrast to being removably mounted to the primary PCB 110, as may be the case for some example CPUs 120, which can be removed by unlatching a retention mechanism.

The power-on sequence may begin when the device 100 is powered on. Immediately after power-on, power is not supplied to all the components of the computing device 100. Instead, power is supplied first to the logic device 150 (among other components), and then the logic device 150 may determine whether, and if so when, power will be supplied to other components (like the CPU 120). In particular, in systems that have multiple voltage rails (which include most computing devices) the rails may need to be turned on in a predetermined order to prevent leakage or damage to devices, and the power sequencing controlled by the logic device 150 ensures that this order is followed. In addition, during the power sequencing, the logic device 150 may check various aspects of the system (e.g., checking that the voltage supplied by the PSU 160 are within specified limits) and, if everything is acceptable, the logic device 150 may provide enablement signals, in the proper sequence mentioned above, to the various power controllers that control the different portion of the power delivery subsystem (e.g., different voltage rails) to enable those devices to begin supplying power to their various components. For example, the VR controller 135 may be configured to prevent the VR converter 131 from converting pwr_2 into the output power p_cpu until an enablement signal has been received from the logic device 150, thus keeping the CPU 120 powered off until the logic device 150 determines it is time to power it on. The different portions of the power delivery subsystem may be provided with their respective enablement signals in a particular sequence determined by the logic device 150, which is why this is referred to as a power on sequence or power sequencing. The enablement signals provided by the logic device 150 may be provided to the power controllers (such as the VR controller 135) via logic input pins of the power controllers (such as logic pin 138 in FIG. 1), which are electrically connected to logic output pins of the logic device 150. In addition to sending the enablement signals to the power controllers, the logic device 150 may also have various other input or output logic pins connected to input or output logic pins of the power controllers to monitor their states and/or control their operations.

In addition, the logic device 150 further comprises power controller programming logic 151. The power controller programming logic 151 includes logic to program one or more of the power controllers, which includes logic to perform operations 152 and 153. Operation 152 comprises causing a power controller of the computing device 100 to enter a programming mode, and operation 153 comprises inputting programming information to the power controller via a logic pin of the power controller. In some examples, the power controller that is programmed in this manner is the VR controller 135. In some examples, the power controller that is programmed in this manner is the PSU controller 165. In some examples, the power controller that is programmed in this manner is another power controller (not illustrated), such as a VR controller of another VR converter (not illustrated). In some examples, multiple power controller may be programmed by the logic device 150, including any combination of the foregoing. To aid understanding, the description below will focus primarily on an example in which the VR controller 135 is programmed by the logic device 150, but it should be understood that the same principles described in relation to programming the VR controller 135 apply, mutatis mutandis, to programming the other power controllers in the device 100 in those examples in which the other power controllers are programmed by the logic device 150. Moreover, the use of the VR controller 135 as an example below should not be misunderstood as implying that the logic device 150 must necessarily program the VR controller 135. Instead, as noted above, in various different examples different power controllers (or different combinations of power controllers) may be programmed by the logic device 150, which may include any combination of one or more of the VR controller 135, the PSU controller 165, or other power controllers.

In some examples, placing the power controller in the programming mode in operation 152 may comprise sending a predetermined signal or code to the power controller which the power controller is configured to interpret as a command to enter the programming mode, such as, for example: applying a particular voltage to a particular logic pin of the power controller, applying a voltage to a particular logic pin for a predetermined amount of time, pulsing a signal on a particular logic pin a predetermined number of times in series, or any other form of signal. In some examples, the power controller may automatically be placed in a programming mode under certain circumstances without requiring the logic device 150 to directly send a signal. For example, in some implementations a VR controller 135 may enter programming mode automatically whenever it is in a state in which it is powered on but an enablement signal is not being sent to the VR controller 135 by the logic device 150, and thus in such examples the logic device 150 may place the VR controller 135 in programing mode by refraining from supplying the enablement signal after power has been initially supplied. Once programming has been completed, the logic device 150 may then supply the enablement signal to resume normal operation.

As noted above, operation 153 comprises inputting programming information via a logic pin of the power controller. This logic pin may also be referred to herein as a "first logic pin" (in this context, "first" is merely a label and does not imply any ordering). For example, FIG. 1 shows the VR controller 135 as having the first logic pin 136, which is connected to a logic pin 156 of the logic device 150, and in some examples, programming information may be sent from pin 156 to pin 136 for inputting into the VR controller 135. In FIG. 1 the logic pins of the VR controller 135 are shown but the logic pins of other power controllers (such as the PSU controller 165) are not illustrated to simplify the drawings, but it should be understood that in some examples other power controllers (such as the PSU controller 165) may also have a "first logic pin" that is used by the logic device 150 to input programming information to the power controller. Examples of logic pins that may be part of a power controller, such as VR controller 135, may include Enable pin, a Power good pin, a Voltage regulator hot pin, a Catastrophic fault pin, an Alert pin, a Power in alert pin, an Input OK pin, an I2C Alert pin, a Presence pin, and an Installed pin, and in some examples one of these pins may be repurposed for use as the first logic pin 136 while in the programming mode.

In some examples, during operation 153, the logic device 150 and the power controller may operate as a scan chain and may shift the programming information into the power controller by using multiple logic pins, including at least the aforementioned first logic pin. For example, while in the power mode the logic device 150 may generate a clock signal and apply this clock signal to a second logic pin of the power controller, such as second logic pin 137 of VR controller 135. The clock signal applied to the second logic pin 137 may comprise a series of cyclical repeating values applied to the second logic pin 137, such as a cycle of logical high voltage followed by logical low voltage followed again by logical high voltage, and so on. Then for each clock cycle (or half cycle) of the clock signal the logic device 150 may supply one bit of the programming data to the first logic pin 136, with the bits being indicated by predetermined voltages applied to the first logic pin 136 (e.g., a high voltage indicating a logical 1 and a low voltage indicating a logical 0, or vice versa). The power controller (e.g., VR controller 135) may in turn be configured to, while in the programming mode, monitor the second logic pin 137 for the clock signal, sample the voltage values present on the first logic pin 136 at each clock cycle (or half cycle), and shift the sampled value into an internal storage medium (such as a shift register, flash memory, or the like) for subsequent processing. The value of the first logic pin 136 may be sampled (read) by the power controller on the rising edge, falling edge, or both rising and falling edges of the clock signal. In this manner a collection of programming information may be shifted serially, one bit at a time, into the power controller.

In some examples, multiple logic pins of the power controller may be used in the manner described above to concurrently shift programming information into the power controller, which may enable multiple bits to be shifted in at a time in parallel. For example, if N logical pins (not counting the pin used for the clock signal) are used for programming, then N bits of the programming information can be shifted into the power controller simultaneously (in parallel) for each clock cycle (or half cycle).

In some examples, the programing of the power controller in operation 153 may include setting/assigning an I2C bus address for the power controller. In some examples, the programing of the power controller in operation 153 may include otherwise changing a configuration of the power controller, such as changes in an operating set point (e.g., target voltage), changes in which phases of a multi-phase VR 130 are operational, changes in switching frequencies of the VRs 130, changes in phase thresholds (e.g., to maximize efficiency for a specific processor SKU), or other changes to the configuration of the power controller. In some examples, some of the changes in configuration of the power controller may be made dynamically (e.g., substantially in real time) based on changes in conditions.

Turning now to FIGS. 2-7, one example process of programing a power controller using one example of the computing device 100 will be described. In this example, a CPLD 250 is used to reprogram a VR controller 235, which controls a VR converter 231. The CPLD 250, VR controller 235, and VR converter 231 are example configurations of the logic device 150, VR controller 135, and VR converter 131 described above. Moreover, in the example of FIGS. 2-7, it is assumed that the programming is occurring at initial power-on of the device.

Figure 2:
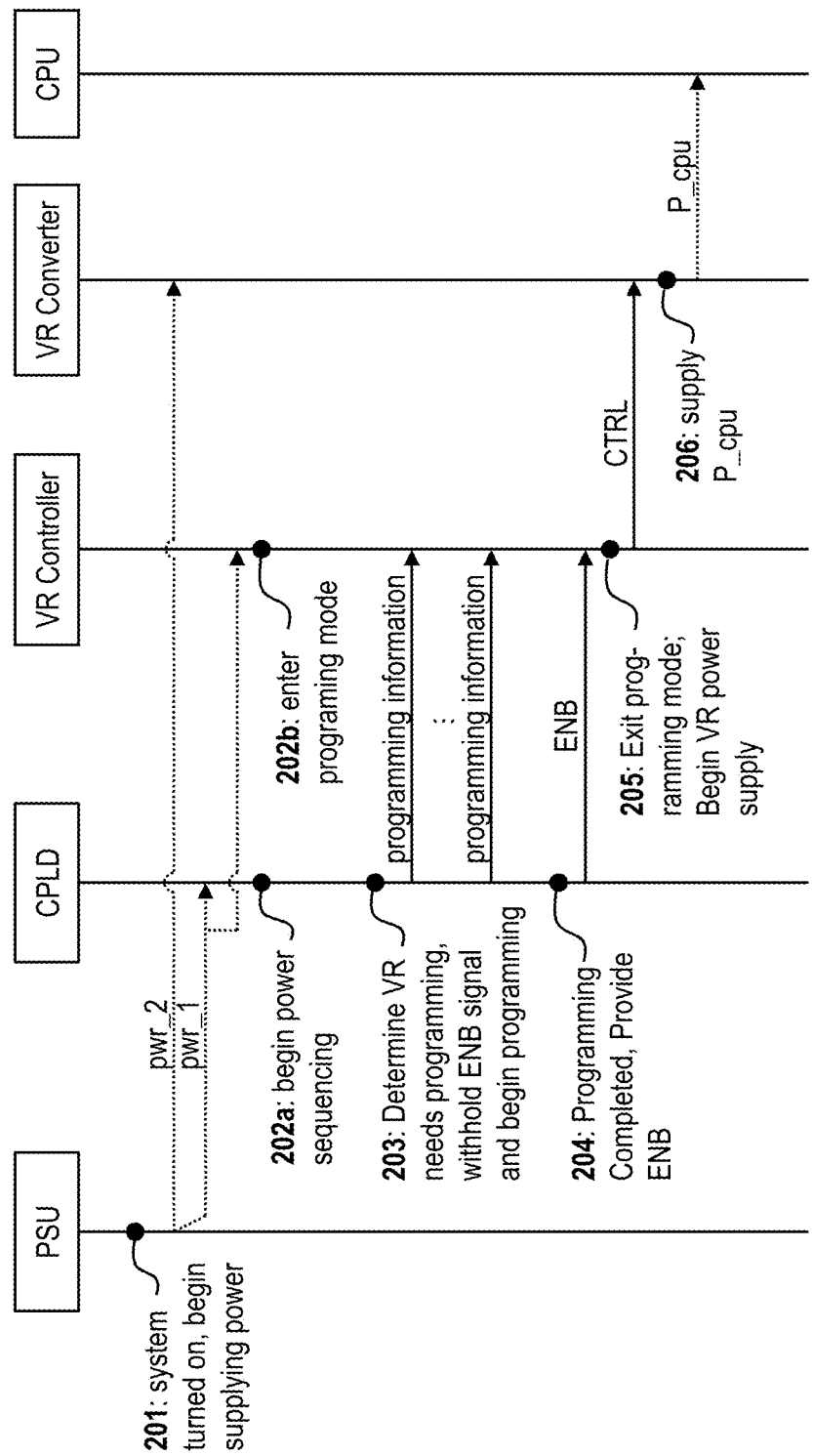
FIG. 2 is a schematic timing and signal diagram illustrating a first example sequence of events and signals associated with programming a voltage regulator controller.
Figure 4:
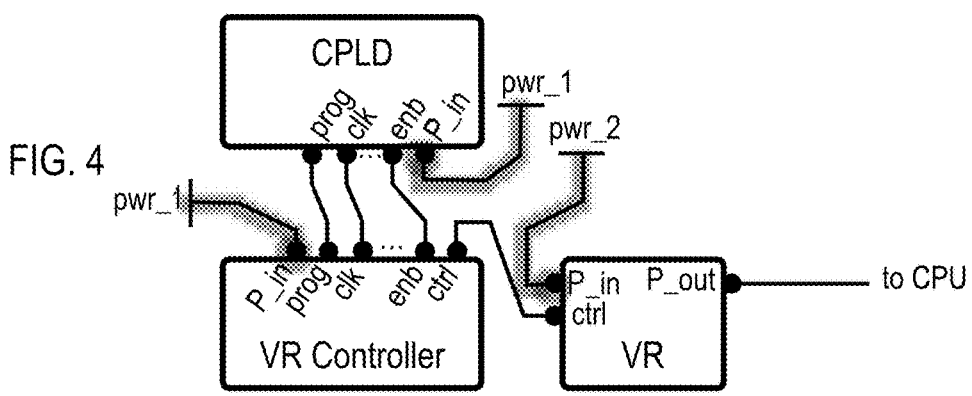
FIG. 4 is a block diagram illustrating the portion of the example computing device of FIG. 3 in a second state.

As shown in FIG. 2, at event 201 the computing system may be turned on, which results in the PSU beginning to supply power (e.g., pwr_1 and pwr_2) to the CPLD 250, VR controller 235, and VR converter 231. FIG. 3 illustrates a first state of the electrical device which is prior to the event 201 (i.e., prior the device being powered on). Thus, in this first state, the CPLD 250 and VR controller 235 are powered off, and no power is supplied by VR converter 231 to the CPU. FIG. 4 illustrates a second state which is subsequent to the event 201 (i.e., subsequent to the device being powered on). In this second state, power is being supplied from the PSU to the CPLD 250, VR controller 235, and VR converter 231, as indicated in FIG. 4 by the darkened lines, but no power is being output from the VR converter 231 to the CPU because the CPLD 250 has not yet sent an enablement signal to the VR controller 250 via the enb pins and therefore the VR controller 250 has not yet supplied a control signal CTRL to the VR converter 231. For example, in some implementations the VR converter 231 may comprise a switch 216 (e.g., transistor), an inductor 214, a capacitor 218, and a diode 219, arranged as shown in the detail 235' in FIG. 3, and in the state shown in FIG. 4 the switch 216 is maintained in an OFF (non-conductive) state because the control signal CTRL is not asserted, and therefore no power flows through the power converter 231 in this state even though input power (pwr_2) is supplied to the VR converter 231.

Returning to FIG. 2, in response to being initially powered on, in event 202a the CPLD 250 begins a power sequencing process. As noted above, this process may comprise performing various checks and then, if everything is okay, sending out enablement signals to enable supply of power to other components.

Concurrently with event 202a, in event 202b the VR controller may automatically enter a programming mode. This may occur, in this example, because the VR controller 235 has been powered on but has not yet received an enablement signal from the CPLD 250.

As part of the power sequencing process, in event 203 the CPLD 250 may determine whether the VR controller 235 needs programming. In some examples, if the VR controller 235 has not yet had an I2C address programmed therein, then the CPLD 250 may determine that the VR controller 235 needs programming. If the CPLD 250 determines that the VR controller 235 does need programming, then the CPLD 250 may withhold the enablement signal (ENB) to hold the VR controller in the programming mode.

Figure 5:
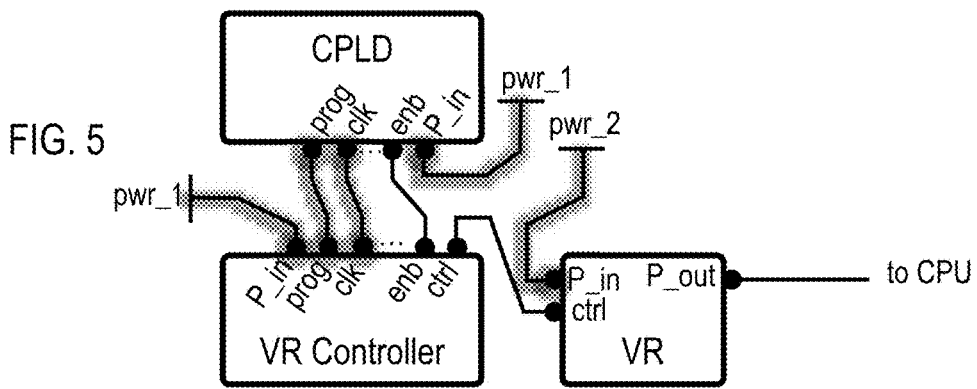
FIG. 5 is a block diagram illustrating the portion of the example computing device of FIG. 3 in a third state.

The CPLD 250 may then send the programming information to the VR controller via one or more of the logic pins of the VR controller. For example, FIG. 5 illustrates a third state in which a bit of programming information is being supplied by the CPLD 250 to the VR controller 235 via a first logic pin, which is labeled "prog" in FIGS. 3-6, while a second logic pin, which is labeled "clk" in FIGS. 3-7, asserts a clock signal. The state shown in FIG. 5 may be repeated multiple times (e.g., once for each bit of the programing information), with the voltage value that is asserted on the prog pin varying according to whichever bit is being transmitted. The clock signal asserted on the clk pin may change values between each data transmission (either once or twice, depending on whether data is sampled on rising edges, falling edges, or both rising and falling edges of the clock). Although only one prog pin is shown, in some examples multiple pins may be used to transmit data concurrently in parallel. Although the prog pin is labeled "prog" in FIGS. 3-6 to aid understanding, this does not necessarily mean that the prog pin is dedicated only to programming—in some examples, the prog pin may be dedicated to programming, while in other example the prog pin may be used for other functions during normal operation and may be used for programming only while in the programming mode.

Figure 6:
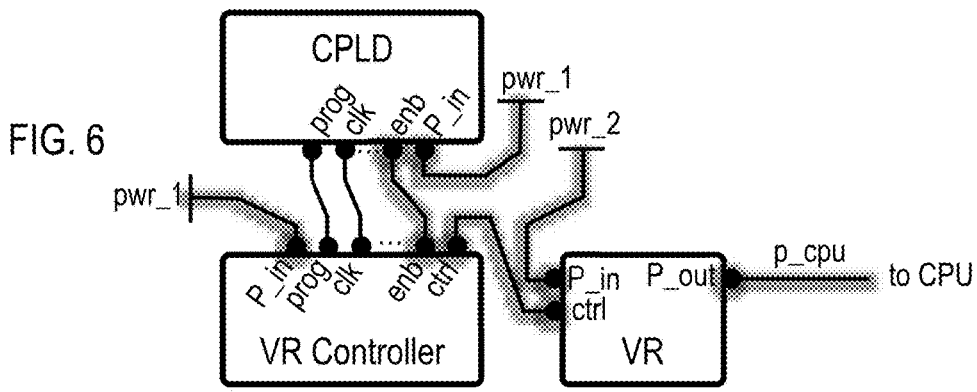
FIG. 6 is a block diagram illustrating the portion of the example computing device of FIG. 3 in a fourth state.

Returning to FIG. 2, in event 204 the CPLD 250 determines that the programming of the VR controller 235 is completed (e.g., all data has been transmitted), and therefore the CPLD 250 may return to the normal power sequencing operations, including transmitting the enablement signal ENB to the VR controller when the CPLD 250 deems it appropriate to do so. In response to receiving the enablement signal ENB, the VR controller in event 205 exits the programming mode and generates the control signal CTRL to cause the VR to begin supplying power to the CPU. The control signal CTRL may be, for example, a pulse-width-modulation (PWM) signal that is applied to a control terminal (e.g., gate) of a switch 216 of the VR converter 231 (see FIG. 3), which causes the switch 216 to cycle between ON (conductive) and OFF (non-conductive) states. This causes power to flow through the converter 231, thus supplying the power P_cpu having a voltage that depends on the duty cycle of the CTRL signal. FIG. 6 illustrates a fourth state which corresponds to event 206, wherein the enablement signal ENB is being asserted and consequently the control signal CTRL is being generated and the output power p_cpu is being supplied.

Figure 7:
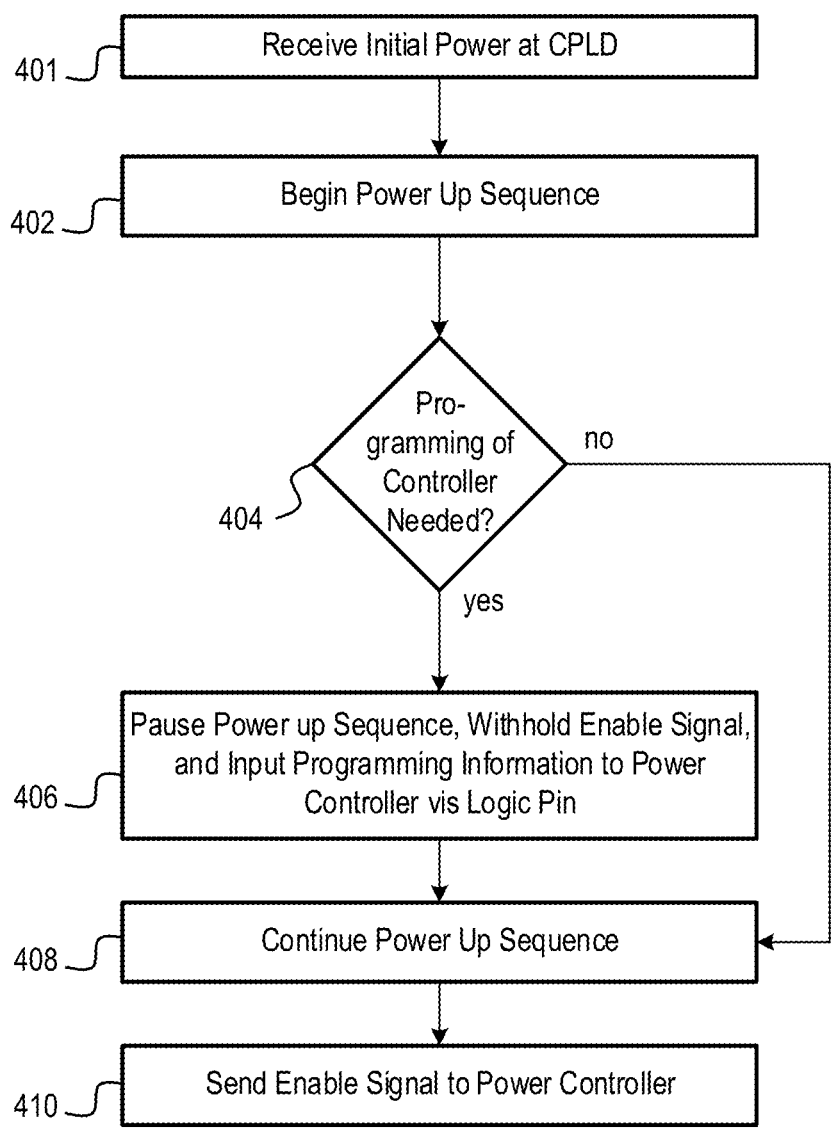
FIG. 7 is a process flow diagram illustrating an example method.

FIG. 7 illustrates an example process. The process is one example of how the computing device 100 may program a power controller.

In block 401, the CPLD receives initial power upon the computing device being powered on.

In block 402, in response to receiving initial power, the CPLD begins a power up sequence.

In block 404, the CPLD determines whether a power controller of the electronic device needs programming. The power controller may need programming because, for example, this is a first time that the power controller has been detected and a new I2C address needs to be programmed therein. If the controller needs to be programmed, the process continues down the YES branch to block 406. If the controller does not need to be programmed, the process continues down the NO branch to block 408.

In block 406, the CPLD may pause the remainder of the power up sequence, withhold the enablement signal from the power controller to be programmed, and begin sending programming information to the power controller via one or more logic pins thereof.

In block 408, once the programming is complete, the CPLD may resume or continue the remainder of the power on sequence.

In block 410, as part of continuing the power on sequence, the CPLD may send the enablement signal to the power controller.

Figure 8:
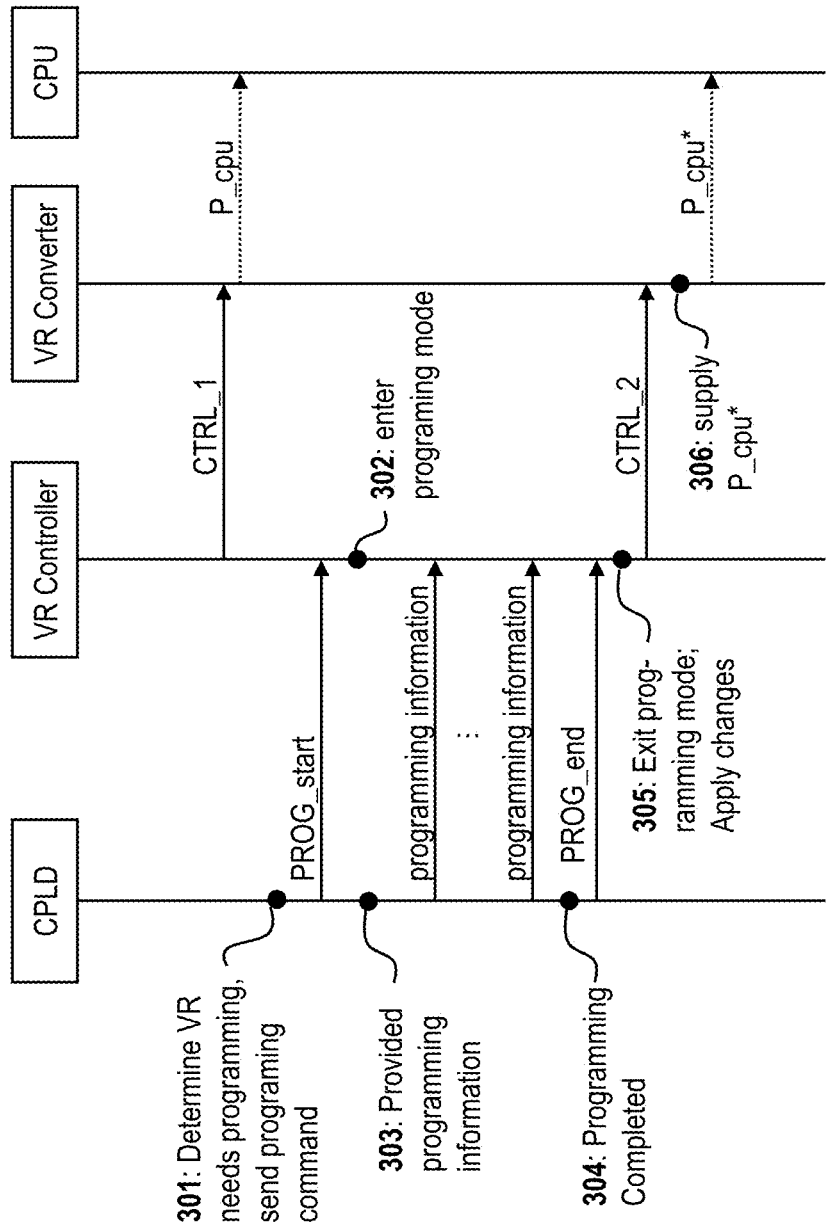
FIG. 8 is a schematic timing and signal diagram illustrating a second example sequence of events and signals associated with programming a voltage regulator controller.

Turning now to FIG. 8, another example of programing a power controller is described herein. This example differs from the example of FIG. 2 in that in this example the programming is performed while the device is in operation, rather than upon initial power on. Thus, in FIG. 8 the control signal CTRL_1 is being supplied to the VR converter and the VR converter is supplying the output power p_cpu to the CPU prior to the programming occurring.

In event 301, the CPLD determines that the VR controller needs to be programmed (e.g., a configuration parameter needs to be changed). This determination may occur in response to sensor feedback, a sensed event, a change in state, or any other identified condition which the CPLD regards as warranting a change in configuration of the VR controller. The CPLD then sends a command PROG_start to the VR controller to cause it to enter a programming mode.

In event 302, the VR controller receives the command PROG_start and enter the programming mode.

In event 303, the CPLD begins sending the programming information to the VR controller via logic pins there.

In event 304, the CPLD determines that the programing is complete and sends a command PROG_end to the VR controller to exit the programming mode.

In event 305, the VR controller receives PROG_end and exits the programming mode. Upon existing the programming mode, the VR controller applies the configuration changes made during the programming. In some cases, applying the configuration changes may cause the control signal output by the VR control to change in accordance with the new configuration settings (e.g., changing a frequency thereof), as indicated in FIG. 8 by the change of the control signal from CTRL_1 to CTRL_2. Applying the configuration changes may also result in the power signal output by the VR converter changing, as indicated in FIG. 8 by the change from p_cpu to p_cpu*.

In the sequence illustrated in FIG. 8, the configuration of the power controller is changed dynamically in real time while the computing device is operational. This type of programming may be useful, for example, to dynamically change the configuration of the power controller in response to changing conditions so as to optimize the power efficiency of the power subsystem.

In the description above, various types of electronic circuitry are described. As used herein, "electronic" is intended to be understood broadly to include all types of circuitry utilizing electricity, including digital and analog circuitry, direct current (DC) and alternating current (AC) circuitry, and circuitry for converting electricity into another form of energy and circuitry for using electricity to perform other functions. In other words, as used herein there is no distinction between "electronic" circuitry and "electrical" circuitry.

It is to be understood that both the general description and the detailed description provide examples that are explanatory in nature and are intended to provide an understanding of the present disclosure without limiting the scope of the present disclosure. Various mechanical, compositional, structural, electronic, and operational changes may be made without departing from the scope of this description and the claims. In some instances, well-known circuits, structures, and techniques have not been shown or described in detail in order not to obscure the examples. Like numbers in two or more figures represent the same or similar elements.

In addition, the singular forms "a", "an", and "the" are intended to include the plural forms as well, unless the context indicates otherwise. Moreover, the terms "comprises", "comprising", "includes", and the like specify the presence of stated features, steps, operations, elements, and/or components but do not preclude the presence or addition of one or more other features, steps, operations, elements, components, and/or groups. Components described as coupled may be electronically or mechanically directly coupled, or they may be indirectly coupled via one or more intermediate components, unless specifically noted otherwise. Mathematical and geometric terms are not necessarily intended to be used in accordance with their strict definitions unless the context of the description indicates otherwise, because a person having ordinary skill in the art would understand that, for example, a substantially similar element that functions in a substantially similar way could easily fall within the scope of a descriptive term even though the term also has a strict definition.

And/or: Occasionally the phrase "and/or" is used herein in conjunction with a list of items. This phrase means that any combination of items in the list—from a single item to all of the items and any permutation in between—may be included. Thus, for example, "A, B, and/or C" means "one of {A}, {B}, {C}, {A, B}, {A, C}, {C, B}, and {A, C, B}".

Elements and their associated aspects that are described in detail with reference to one example may, whenever practical, be included in other examples in which they are not specifically shown or described. For example, if an element is described in detail with reference to one example and is not described with reference to a second example, the element may nevertheless be claimed as included in the second example.

Unless otherwise noted herein or implied by the context, when terms of approximation such as "substantially," "approximately," "about," "around," "roughly," and the like, are used, this should be understood as meaning that mathematical exactitude is not required and that instead a range of variation is being referred to that includes but is not strictly limited to the stated value, property, or relationship. In particular, in addition to any ranges explicitly stated herein (if any), the range of variation implied by the usage of such a term of approximation includes at least any inconsequential variations and also those variations that are typical in the relevant art for the type of item in question due to manufacturing or other tolerances. In any case, the range of variation may include at least values that are within ±1% of the stated value, property, or relationship unless indicated otherwise.

Further modifications and alternative examples will be apparent to those of ordinary skill in the art in view of the disclosure herein. For example, the devices and methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various examples shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the scope of the present teachings and following claims.

It is to be understood that the particular examples set forth herein are non-limiting, and modifications to structure, dimensions, materials, and methodologies may be made without departing from the scope of the present teachings.

Other examples in accordance with the present disclosure will be apparent to those skilled in the art from consideration of the specification and practice of the invention disclosed herein. It is intended that the specification and examples be considered as exemplary only, with the following claims being entitled to their fullest breadth, including equivalents, under the applicable law.

What is claimed is:

1. A computing device comprising:
   a primary printed circuit board (PCB);
   one or more computing components mounted to the primary PCB;
   a baseboard management controller (BMC) mounted to the primary PCB;
   a power subsystem comprising a power controller comprising a first logic pin; and
   a logic device coupled to the primary PCB and communicably connected to the first logic pin,
   wherein the logic device is configured to program the power controller by placing the power controller in a programming mode and inputting programming information into the power controller via the first logic pin,
   wherein the power subsystem comprises a voltage regulator (VR) mounted to the primary PCB, the VR comprising a VR converter configured to supply electrical power to one of the computing components and a VR controller configured to control the VR converter, and wherein the power controller comprises the VR controller.

2. The computing device of claim 1, wherein the one or more computing components comprises a central processing unit (CPU), and the VR converter is configured to supply electrical power to the CPU.

3. The computing device of claim 1, wherein the logic device is configured to place the power controller in the programming mode by withholding an enablement signal from the power controller.

4. The computing device of claim 1, wherein the logic device is configured to place the power controller in the programming mode by sending the power controller a command via a logic pin of the power controller, the logic pin comprising the first logic pin or another logic pin of the power controller.

5. The computing device of claim 1, wherein the logic device is configured to input the programming information into the power controller by supplying a clock signal to a second logic pin of the power controller and shifting bits of the programming information into the power controller by applying signals to the first logic pin in synchronization with the clock signal.

6. The computing device of claim 1, wherein the logic device is a complex programmable logic device configured to control a power on sequence of the computing device.

7. The computing device of claim 6, wherein the logic device is integrated into the primary PCB.

8. The computing device of claim 6, wherein the logic device is configured to program the power controller as part of the power on sequence in response to the computing device being powered on.

9. The computing device of claim 8, wherein the computing device further comprises a communication bus communicably coupling the BMC with the power subsystem, and wherein the programing of the power controller by the logic device comprises programming a bus address for the power controller.

10. The computing device of claim 1, wherein the power subsystem comprises a power supply unit (PSU) which is removably coupled to the primary PCB.

11. The computing device of claim 1, wherein the logic device is separate and distinct from the BMC, and the logic device is configured to program the power controller independently from the BMC.

12. The computing device of claim 1, wherein the computing device further comprises a communication bus communicably coupling the BMC with the power subsystem, and wherein the programing of the power controller by the logic device does not rely upon any communications sent through the communication bus.

13. The computing device of claim 1, wherein the logic device comprises an output logic pin that is directly electrically coupled to the first logic pin and the programming information is transferred from the output logic pin to the first logic pin.

* * * * *